United States Patent [19]
Linder et al.

[11] Patent Number: 5,279,328
[45] Date of Patent: Jan. 18, 1994

[54] WEIR VALVE WITH ADJUSTABLE BYPASS

[75] Inventors: James C. Linder, Shorewood; Jeffrey J. McKenzie, Watertown, both of Minn.

[73] Assignee: Fluoroware, Inc., Chaska, Minn.

[21] Appl. No.: 4,854

[22] Filed: Jan. 19, 1993

[51] Int. Cl.⁵ ................................................. F16K 1/00
[52] U.S. Cl. ...................................... 137/599; 251/331
[58] Field of Search ................. 137/599; 251/61.1, 331

[56] References Cited

U.S. PATENT DOCUMENTS

| | | | |
|---|---|---|---|
| 2,310,628 | 2/1943 | Grove | 137/599 |
| 2,475,783 | 7/1949 | Gibbo | 137/599 X |
| 2,525,709 | 10/1950 | Morrison | 62/141 |
| 2,564,922 | 8/1951 | Patten | 277/60 |
| 2,907,346 | 10/1959 | Fortune | 137/599 X |
| 3,105,507 | 10/1963 | Dunmire | 251/331 X |
| 3,198,205 | 8/1965 | Boteler | 251/331 X |
| 3,633,874 | 1/1972 | Veugelers | 251/331 X |
| 4,653,526 | 3/1987 | Hoiss | 137/240 |
| 4,977,992 | 12/1990 | Chinnock et al. | 137/863 |
| 5,007,395 | 4/1991 | Wakeling | 251/61.1 X |

Primary Examiner—Stephen M. Hepperle
Attorney, Agent, or Firm—Palmatier, Sjoquist & Helget

[57] ABSTRACT

The invention disclosed is a weir valve with an adjustable bypass incorporated into the weir portion of the valve housing. The valve housing has an interior chamber with an inlet portion, a middle portion and outlet portion. An elongate weir traverses the middle portion of the interior chamber and separates the inlet portion and outlet portion. The top surface of the weir defines a valve seat. A diaphragm traverses the interior chamber and is moveable by a compressor onto the weir effecting a closure of the valve. The adjustable bypass consists of a bypass chamber which extends longitudinally of the elongate weir with inlet and outlet openings centrally located on the sides of the weir between the bypass chamber and the inlet portion and outlet portion respectively. A bypass valve member is adjustably moveable in the bypass chamber to variably restrict the communication between the inlet and outlet openings.

17 Claims, 3 Drawing Sheets

WEIR VALVE WITH ADJUSTABLE BYPASS

BACKGROUND OF THE INVENTION

The present invention relates to valves, more particularly to weir valves.

A weir valve is a valve utilizing a resilient diaphragm to traverse a weir and prevent the flow of fluid over the weir. The diaphragm may be lifted off the weir, either hydraulically by the fluid when released or mechanically to permit flow over the weir.

Weir valves provide excellent sealing and isolation characteristics to effectively contain the fluid, substantially eliminating leakage or migration into the valve mechanisms or exterior of the valve. Weir valves are also more amenable than conventional valves in designing direct and streamlined fluid flow courses through the valves. In many applications, particularly in the semiconductor industry, quiescent or dead spots in the fluid flow course must be avoided as these can cause the fluid to become stagnant or degrade. Additionally, contaminants or suspended solids can accumulate in the quiescent or dead spots. Due to these advantages, weir valves are found in the biotechnological, pharmaceutical, chemical, semiconductor, food processing, beverage, cosmetic, and dairy industries.

The resilient nature of the diaphragm in weir valves presents difficulties in allowing small quantities of fluid flow. The resilient diaphragm creates a soft bottoming when the valve is seated, thus making it difficult to manually determine when and to what extent the valve is slightly unseated or open. Additionally, the closure position of the resilient diaphragm can be dependent upon the fluid pressure. For example, a weir valve which is not tightly closed can be opened by a slight pressure increase. Conversely, a weir valve that is slightly open under a given pressure can become closed when the fluid pressure drops. Further, in some situations, the resilient diaphragm will oscillate when the valve is throttled at low flow rates and high pressures resulting in downstream pressure oscillations. Pressure and flow rate fluctuations or oscillations are undesirable in virtually any application.

Many weir valves, particularly pneumatically operated ones, are simply not adjustable, having only an open or a closed position.

In many applications it is often desirable or necessary to allow limited quantities of the fluid to continue to flow after the particular application or use has ceased. For example, in the semiconductor manufacturing industry ionized water is often used in various processes. Such fluid is subject to degradation if the fluid flow in not continuous.

In many applications required flow rates can vary over a wide range, weir valves are not amenable to allowing or reliably controlling the relatively minute flow rates sometimes required. Additional fluid conduits and separate valves for supplying and controlling lower flow rates can result in the degradation, stagnation, and accumulation of contaminant type of problems in which weir valves are intended to prevent.

SUMMARY OF THE INVENTION

The invention disclosed is a weir valve with an adjustable bypass incorporated into the weir portion of the valve housing. The valve housing has an interior chamber with an inlet portion, a middle portion and outlet portion. An elongate weir traverses the middle portion of the interior chamber and separates the inlet portion and outlet portion. The top surface of the weir defines a valve seat. A diaphragm traverses the interior chamber and is moveable by a compressor onto the weir effecting a closure of the valve. The adjustable bypass consists of a bypass chamber which extends longitudinally of the elongate weir with inlet and outlet openings centrally located on the sides of the weir between the bypass chamber and the inlet portion and outlet portion respectively. A bypass valve member is adjustably moveable in the bypass chamber to variably restrict the communication between the inlet and outlet openings.

An object of the invention is to provide a weir valve incorporating an adjustable bypass.

An object of the invention is to provide a weir valve which can allow a limited flow through the valve with the weir portion of the valve totally closed.

An object and advantage of the present invention is that the amount of flow can be minutely adjusted and controlled to an extent not possible with conventional weir valves.

Another advantage is that the closure position of the adjustable bypass and correspondingly the flow rate is not dependant on the pressure of the fluid as is the case with conventional weir valves. Thus, the flow rate and pressure level oscillations which can occur in conventional weir valves is eliminated.

Another feature of the invention is that the inlet and outlet openings are located approximately coaxial with the inlet portion and the outlet portion of the interior chamber. This central placement permits a very even fluid draw into the inlet opening of the bypass chamber. Fluid from all regions of the inlet portion, including the region adjacent to the diaphragm, flow toward the inlet opening in substantially equal flow rates. Similarly, the centrally located outlet opening produces a very evenly dispersed flow out into the outlet portion. The even flow draw and dispersal effectively minimizes quiescent or dead areas in the inlet portion and outlet portion.

Another advantage is the location of the bypass in the weir permits a very direct flow between the inlet and outlet portions minimizing quiescent or dead areas in the bypass.

Another object and advantage of the invention is that the valve is symmetrical with respect to the weir and bypass assembly. This provides identical operating, flow, and drainage characteristics in either direction, permitting flexibility in the installation of the valve.

Another feature of the invention is that the configuration of the valve permits the device to be readily manufactured by way of injection molding with minimal or no additional machining after molding.

Another advantage is that the configuration of the valve with the bypass in the weir makes optimal use of the valve housing. This area of the valve housing would normally not be used and accordingly the additional space required for the adjustable bypass is minimized.

DETAILED DESCRIPTION OF THE PREFERRED EMBODIMENTS

FIGS. 1, 2, 3, 4, and 5 show a manually operated embodiment of the weir valve with adjustable bypass 10.

Figure 1:
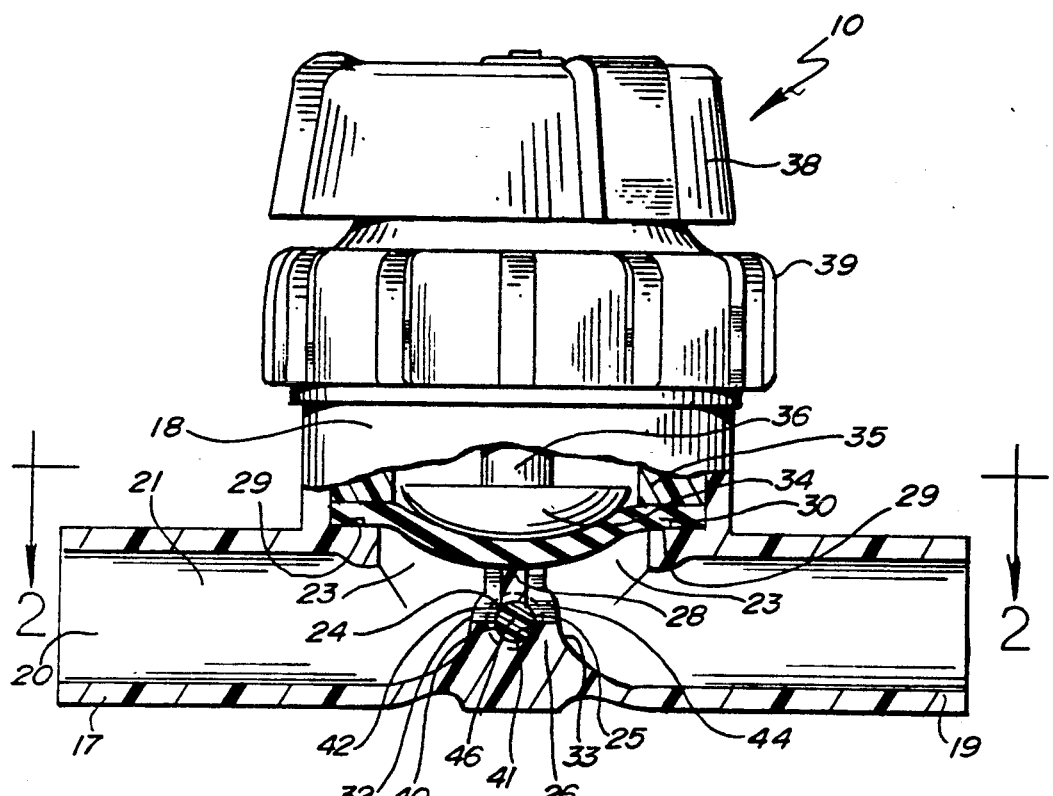
FIG. 1 is front elevational view with a partial section of the weir valve with adjustable bypass.

FIG. 1 shows the valve housing 18 including the inlet conduit 17 and outlet conduit 19. Within the inlet conduit 17 and the outlet conduit 19 are the inlet portion 21 and outlet portion 22 separated by the weir 26. Extending from the housing 18 is a handle 38 which is rotated to raise or lower the compressor 34 without the compressor 34 rotating. A conventional mechanism for raising or lowering the compressor is located within the housing 18 and connects to the compressor 34 by the compressor stem 36. The compressor 34 engages with the diaphragm 30 either by simple contact or by attachment means. The diaphragm 30 is disc shaped and made of a resilient elastomeric material. The diaphragm 30 is held in place on the compressor 34 by a ring shaped retainer member 35. A ridge 29, assists in holding the diaphragm 30 in position and provides a sealing effect. The retainer member 35 also guides the compressor 34 in its upward and downward movement. The external retainer ring 39 closes the housing 18 and is a means to provide downward force on the retainer member 35.

Contained within the weir 26 is an elongate bypass chamber 40. The bypass chamber 40 communicates within the inlet portion 21 and outlet portion 22 through the bypass inlet slot 42 and bypass outlet slot 44 respectively. The bypass valve member 46 is sized for a close fit within the bypass chamber 40. The valve member 46 and bypass chamber 40 can be sized as needed. As can be seen, the configuration could be classified as a needle valve.

Figure 2:
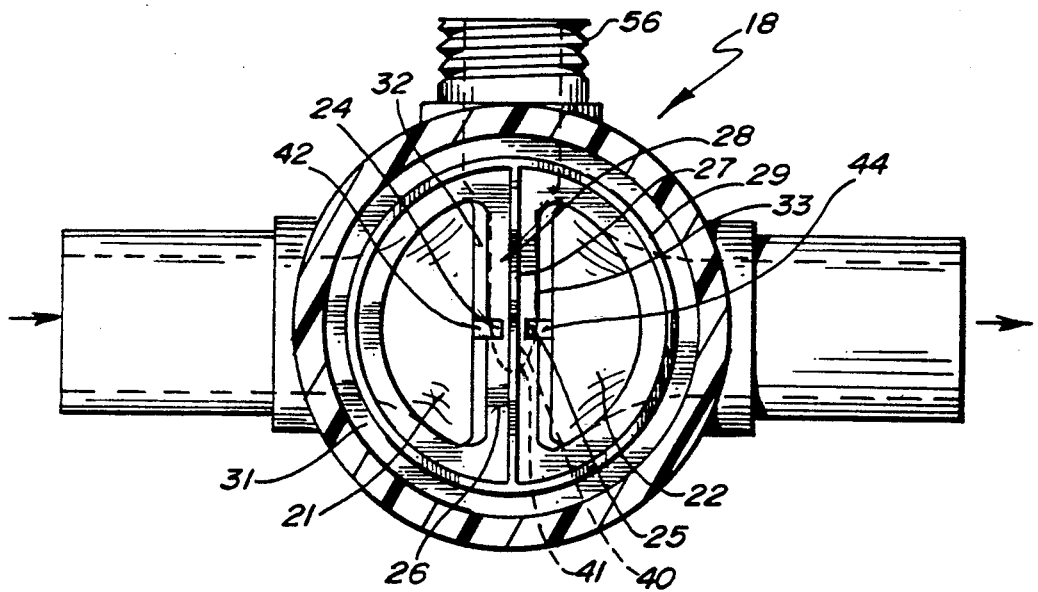
FIG. 2 is section view of the valve housing taken at line 2—2 of FIG. 1.

FIG. 2 shows a plan view of the valve housing 18 with the adjustable bypass assembly 55, the retainer member 35, and the diaphragm 30 removed. The diaphragm 30 is positioned on the diaphragm seat 31. The circular ridge 29 facilitates holding the diaphragm 30 in place on the diaphragm seat 31. The top surface 28 of the weir 26 constitutes a valve seat 27 on which the diaphragm 30 seats when depressed by the compressor 34. The bypass chamber 40 runs longitudinal with the weir 26 and exits the housing 18 at the bypass assembly hub 56. The inlet slot 42 and outlet slot 44 extend down from the top surface 28 of the weir 26 and communicate with the bypass chamber 40. The bypass assembly hub 56 extends from the valve housing 18 to provide means to secure the bypass assembly 43 shown in FIGS. 3 and 4.

Figure 3:
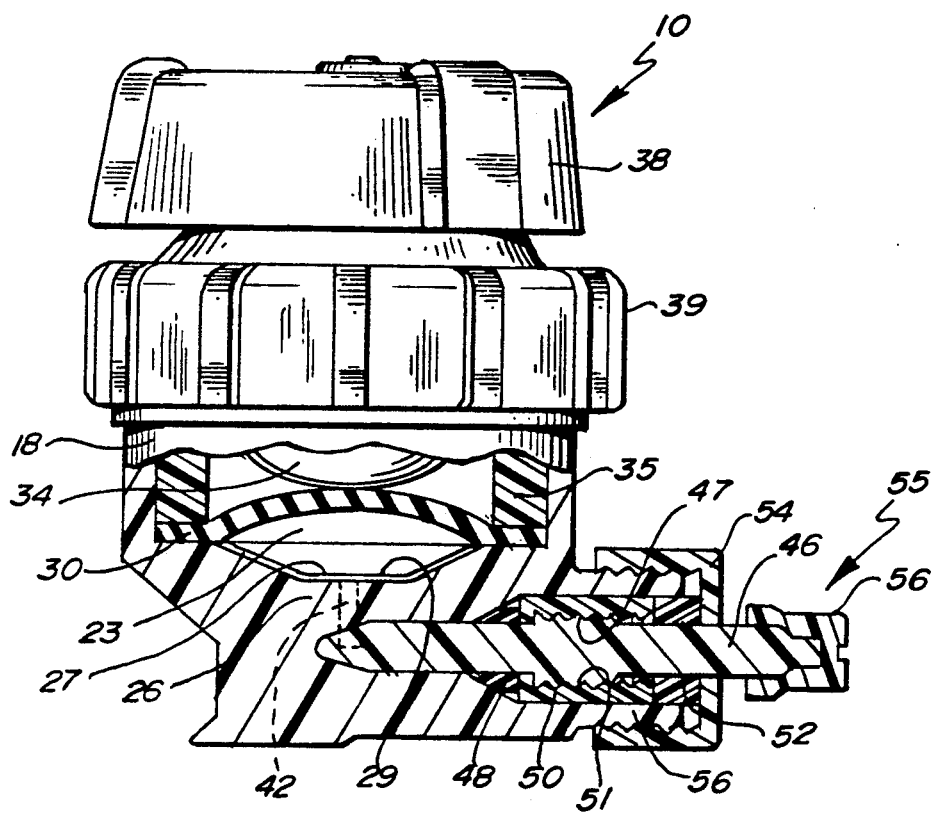
FIG. 3 is a side elevation view with a partial section showing the weir valve open and the bypass closed.

FIG. 3 shows the bypass assembly 55 in a closed position with the bypass valve member 46 fully extended into the bypass chamber 40. The bypass assembly 55 consists of the valve member 46, a seal 48, an actuator nut 50, a spacer 52, a stem cap 56, and an outer cap 54. The outer cap 54 is attached to the valve housing 18 by way of the threaded connection on the bypass assembly hub 56. The outer cap 54 contacts the spacer 52 which compresses against the actuator nut 50 and further provides compression in an axial direction on the seal 48. This seal 48 under compression effectively seals the bypass chamber 40 from the exterior of the valve. The actuator nut 50 has a threaded inside surface 51 which cooperates with the threaded exterior surface 47 of the valve member 46. The stem cap 56 is suitably affixed to the valve member 46 to facilitate adjustment of the bypass by rotation of the bypass valve member 46.

FIG. 3 shows the compressor 34 in an elevated position and correspondingly the diaphragm assembly 30 also is raised off of the weir 26 revealing the middle portion 23 of the interior chamber 20. In this position fluid may flow through the valve 10 by entering the inlet portion 21 moving up and over the weir inlet surface 32, over the top surface 28 of the weir 26, down the weir outlet surface 33, and into the outlet portion 22. The designation of the inlet portion 21 and outlet portion 22 in the embodiment shown is arbitrary. Notably, in this embodiment the valve 10 is symmetrical in reference to the weir 26 and fluid flow characteristics are the same and are controlled equally well in either direction.

Figure 4:
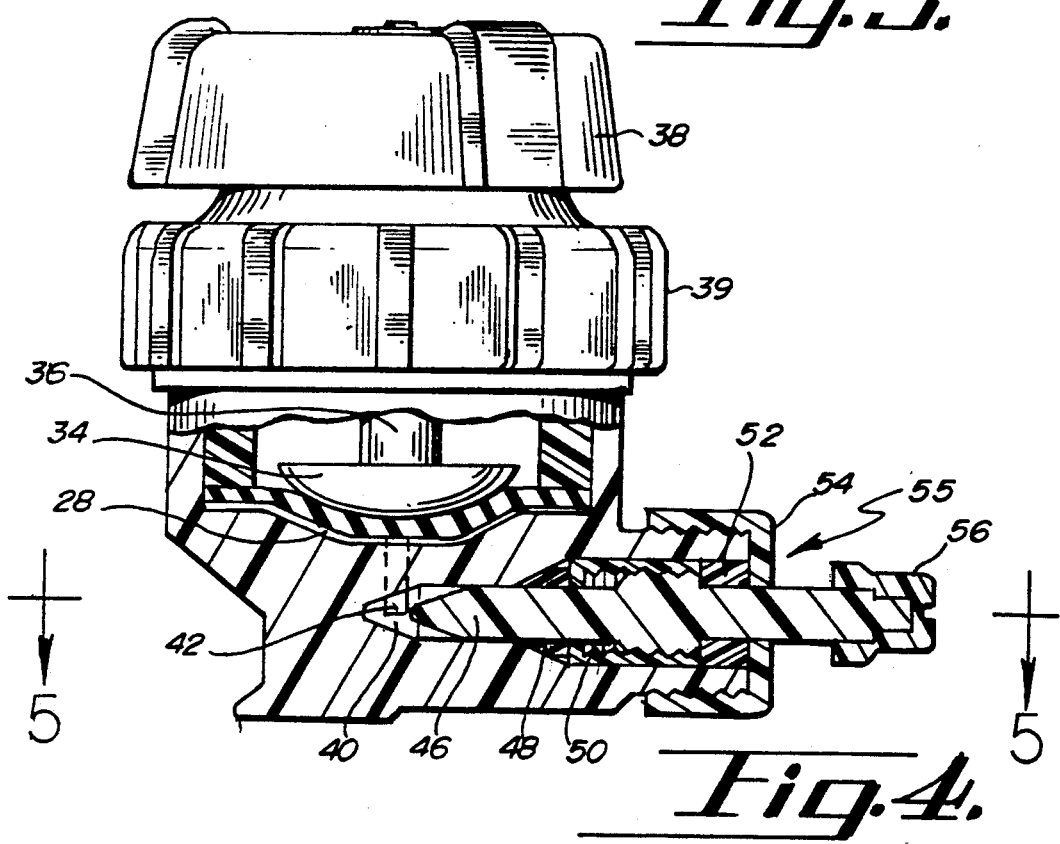
FIG. 4 is the side elevation view of FIG. 3 with the weir valve closed and the bypass valve member open.

FIGS. 1 and 4 show the compressor 34 bearing against the diaphragm 30 engaged with the valve seat 27 on the top surface 28 of the weir 26. In this position fluid flow over the weir 26 is precluded.

FIG. 4 shows the bypass valve member 46 backed out of the bypass chamber 40. With the bypass valve member 46 in this position, fluid may flow from the inlet portion 21 into the bypass inlet slot 42, into the bypass chamber 40, out the bypass outlet slot 44 into the outlet portion 22. With the valve member in this position fluid flow through the bypass is direct and minimally impeded as can best be seen in FIG. 5. The direct flow minimizes quiescent or dead areas within the bypass chamber 40.

Figure 5:
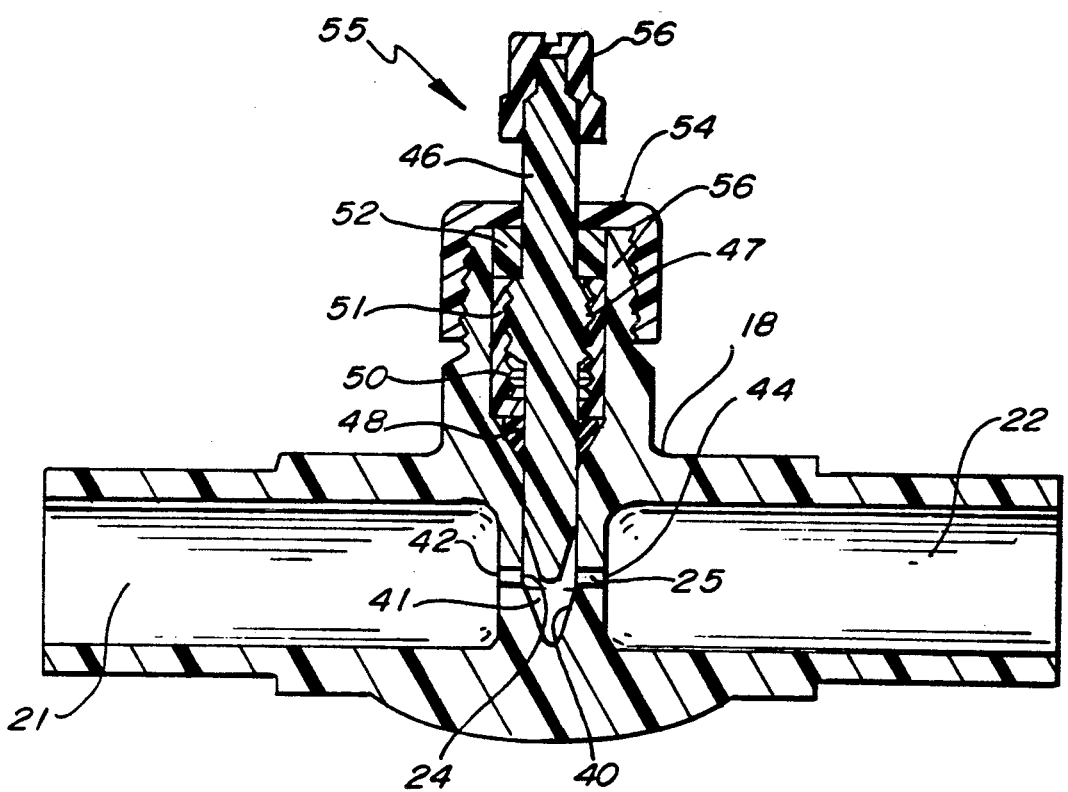
FIG. 5 shows a sectional taken on line 5—5 of FIG. 4.

FIG. 5 shows the central location of the inlet opening 24 on the inlet side 32 of the weir 26 and the outlet opening 25 on the outlet side 33 as well as the direct communication between the inlet portion 21 and outlet portion 22. The bypass valve member 46 is variably adjustable from the closed position shown in FIG. 3 to the open position shown in FIGS. 4 and 5.

The embodiment shown utilizes a manual means to seat the diaphragm 30 on the weir 10. Other means are anticipated and known, such as pneumatic, hydraulic, and electromechanical means. Similarly, the bypass valve 46 can be operated by various means other than manual operation.

The valve housing 18 may be formed of any number of materials including but not limited to perfluoroalkoxy resin (PFA), polyvinylidene fluoride (PVDF), polyvinyl chloride (PVC), polypropylene (PP), or stainless steel. The diaphragm 30 may be formed of Viton or rubber-like fluoroelastomer and may have a lower surface of a different material to come in contact with the fluid such as polytetrafluoroethylene (PTFE).

Notably, the simple configuration of the valve makes it suitable for injection molding with little or no additional machining necessary.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A weir valve incorporating an adjustable bypass, comprising
    a valve housing having an interior chamber, the interior chamber comprised of an inlet portion, a middle portion, and an outlet portion, the inlet portion communicating with the outlet portion by way of the middle portion;

an elongate weir traversing the middle portion of the interior chamber and separating the inlet portion and outlet portion, the weir having a top surface defining a valve seat; an inlet side facing the inlet portion and an outlet side facing the outlet portion;

a diaphragm traversing the interior chamber and confronting the valve seat, the diaphragm engageable onto the valve seat, thereby obstructing the communication between the inlet portion and the outlet portion;

a diaphragm operating means to move the diaphragm onto the valve seat;

the weir having a bypass chamber discrete from the interior chamber, the bypass chamber extending longitudinally of the weir inside the weir, the weir having an inlet opening on the inlet side of the weir and an outlet opening on the outlet side of the weir, the openings connecting the bypass chamber to the inlet portion and outlet portion of the interior chamber respectively, whereby the inlet portion communicates with the outlet portion through the weir by way of the bypass chamber; and an adjustable closing means for varying the communication between the inlet portion and outlet portion through the bypass chamber, the closing means comprising a tapered cylindrical bypass valve member, the valve member engaged in the bypass chamber and positioned so as to be nonintrusive with the interior chamber, the bypass valve member adjustably movable longitudinally in the bypass chamber so as to variably restrict the communication between the inlet portion and the outlet portion through the bypass chamber.

2. The weir valve of claim 1, wherein the diaphragm operating means comprises:

a compressor confronting the diaphragm, opposite the weir, the compressor moveable toward and away from the weir, whereby movement of the compressor towards the weir engages the diaphragm with the valve seat, and a compressor operating means.

3. The weir valve of claim 2, wherein the inlet opening is centrally located on the weir inlet side and the outlet opening is centrally located on the weir outlet side.

4. The weir valve of claim 2, wherein the compressor operating means comprises a manually rotatable handle connected by a coupling means whereby rotation of the handle moves the compressor toward or away from the weir dependent on the direction of the handle rotation.

5. The weir valve of claim 2, wherein the compressor is mechanically connected to the diaphragm.

6. The weir valve of claim 5, wherein the bypass chamber has a surface surrounding the inlet and outlet openings, the surface surrounding each opening defining a valve seat, whereby the bypass valve member is adjustably moveable to a closure position by seating the valve member on the valve seats.

7. The weir valve of claim 5, wherein the inlet opening is contiguous with an inlet slot extending up the inlet side and the outlet opening is contiguous with an outlet slot extending up the outlet side.

8. The weir valve of claim 5, wherein the closing means further comprises a sealing means between the bypass valve member and the valve housing.

9. The weir valve of claim 8, further comprising a threaded actuator nut attached to the valve housing and wherein the bypass valve member has a threaded surface portion, the threaded surface portion engaged with the threaded actuator nut, whereby the rotation of the bypass valve member moves the valve member longitudinally in the bypass chamber.

10. A weir valve incorporating an adjustable bypass, an inlet conduit, an outlet conduit comprising an elongate valve housing having an interior chamber, the interior chamber comprised of an inlet portion defined by the inlet conduit, a middle portion, and an outlet portion defined by the outlet conduit, the inlet portion communicating with the outlet portion by way of the middle portion;

an elongate weir traversing the middle portion and separating the inlet portion and outlet portion, the weir having a top surface defining a valve seat, an inlet side facing the inlet portion, and an outlet side facing the outlet portion;

a diaphragm traversing the interior chamber and confronting the valve seat, the diaphragm engageable onto the valve seat, thereby obstructing the communication between the inlet portion and the outlet portion;

a compressor confronting the diaphragm, opposite the weir, the compressor moveable toward and away from the weir, whereby movement of the compressor towards the weir engages the diaphragm with the valve seat;

a compressor operating means;

the weir having a bypass chamber discrete from the interior chamber and substantially coplanar with the weir, the weir having an inlet opening on the inlet side of the weir and an outlet opening on the outlet side of the weir, the openings connecting the bypass chamber to the inlet portion and outlet portion of the interior chamber respectively, whereby the inlet portion communicates with the outlet portion through the weir by way of the bypass chamber; and an adjustable closing means for varying the communication between the inlet portion and outlet portion through the bypass chamber, the closing means comprising a cylindrical bypass valve member engaged in the bypass chamber, the valve member positioned so as to be nonintrusive with the interior chamber, the bypass member adjustably moveable longitudinally in the bypass chamber to variably restrict the communication between the inlet portion and outlet portion through the bypass chamber.

11. The weir valve of claim 10, wherein the inlet opening is substantially coaxial with the inlet conduit and the outlet opening is substantially coaxial with the outlet conduit.

12. The weir valve of claim 11, wherein the compressor movement means comprises a manually rotatable handle and a coupling means connecting the compressor and the handle whereby rotation of the handle moves the compressor toward or away from the weir dependent on the direction of the handle rotation.

13. The weir valve of claim 11, wherein the compressor operating means is pneumatic.

14. The weir valve of claim 11, wherein the bypass chamber extends longitudinally of the elongate weir.

15. The weir valve of claim 14, wherein the bypass valve member is tapered and is moveable longitudinally in the bypass chamber to variably restrict the communication between the inlet portion and outlet portion through the bypass chamber.

16. The weir valve of claim 15 wherein the inlet opening is contiguous with an inlet slot extending up the inlet side and the outlet opening is contiguous with an outlet slot extending up the outlet side.

17. A weir valve incorporating an adjustable bypass, comprising
- a valve housing having an inlet conduit, an outlet conduit and an interior chamber, the interior chamber comprised of an inlet portion, a middle portion, and an outlet portion, the inlet portion defined by the inlet conduit, the outlet portion defined by the outlet conduit, and the inlet portion communicating with the outlet portion by way of the middle portion;
- an elongate weir traversing the middle portion of the interior chamber and separating the inlet portion and outlet portion, the weir having a top surface defining a valve seat; an inlet surface facing the inlet portion and an outlet surface facing the outlet portion;
- a diaphragm traversing the interior chamber and confronting the valve seat, the diaphragm engageable onto the valve seat, thereby obstructing the communication between the inlet portion and the outlet portion;
- a compressor confronting the diaphragm, opposite the weir, the compressor moveable toward and away from the weir, whereby movement of the compressor towards the weir engages the diaphragm with the valve seat;
- a compressor operating means to move the diaphragm onto the valve seat;
- the elongate weir having a bypass chamber discrete from the interior chamber extending longitudinally of the weir with an inlet opening contiguous with an inlet slot on the inlet side and an outlet opening contiguous with an outlet slot on the outlet side, the openings connecting the bypass chamber to the inlet portion and outlet portion of the interior chamber respectively, the inlet opening substantially coaxial with the inlet conduit, the outlet opening substantially coaxial with the outlet conduit, whereby the inlet portion communicates with the outlet portion through the weir by way of the bypass chamber; and
- a tapered cylindrical bypass valve member having a threaded surface portion and engaged in the bypass chamber, the bypass valve member positioned so as to be nonintrusive with the interior chamber, and extending from the bypass chamber to exterior of the valve housing, the bypass valve member having a threaded surface portion; and
- a threaded actuator nut attached to the valve housing and cooperating with the threaded surface portion, whereby the rotation of the bypass valve member moves the bypass valve member longitudinally in the bypass chamber to adjustably restrict the communication between the inlet opening and outlet opening.

* * * * *